United States Patent [19]

Anello et al.

[11] Patent Number: 5,473,678
[45] Date of Patent: Dec. 5, 1995

[54] COIN RETURN MECHANISM PROTECTER

[75] Inventors: Salvatore Anello, Highland; Albert F. Diaz, Lynbrook; Nathan M. Turk, Highland, all of N.Y.

[73] Assignee: Sandt Technology, Ltd., Marlboro, N.Y.

[21] Appl. No.: 197,168

[22] Filed: Feb. 16, 1994

[51] Int. Cl.$^6$ .......................... H04M 17/00; H04M 1/00
[52] U.S. Cl. .......................... 379/145; 379/437; 379/451
[58] Field of Search .......................... 379/145, 150, 379/437, 451, 155, 143, 147, 155; 194/350, 345, 202; 232/15.16

[56] References Cited

U.S. PATENT DOCUMENTS 5,146,492 9/1992 Stone et al. .......................... 379/145
5,291,981 3/1994 Anello et al. .......................... 379/145

Primary Examiner—Stephen Chin
Assistant Examiner—Kevin Kim
Attorney, Agent, or Firm—Joseph B. Taphorn

[57] ABSTRACT

A coin-operated pay telephone is made secure from the removal of the coin return mechanism by a vandalizing bar and the subsequent collection of returned coins by vandals. A security bar is inserted behind the coin chute and down through an opening in an intermediate strengthening plate to block rocking of the coin return mechanism by a vandalizing bar and its translation forward out of the casing through the opening in which a finger is normally inserted to retrieve coins for incompleted telephone calls. The security bar includes a shoulder which rest on top of the rear edge of the coin return mechanism. The rear of the security bar includes a horizontal slot which is received on the portion of the strengthening plate behind its opening to prevent displacement of the security bar.

14 Claims, 3 Drawing Sheets

5,473,678

COIN RETURN MECHANISM PROTECTER

INTRODUCTION

1. Field of the Invention

This invention relates to coin telephone security devices, and more particularly to such security devices for protecting pay telephones from removal of the coin return mechanisms and further vandalism.

2. Background of the Invention

Vandalism of coin operated public pay phones is one of the biggest problems facing public and private telephone companies. Pay phones are exposed day and night to professional and amateur criminals who find the significant somes of money collected therein on a continuous basis, a serious temptation. The exposed and isolated nature of pay phone installations renders the vandalism acts relative safe for the criminal.

A pay telephone includes a coin return mechanism to which a potential caller's money is returned in the event a call cannot be completed as when the called number is busy. Vandals have discovered that the coins normally returned to the unsuccessful caller can be appropriated to themselves by first removing the coin return mechanism. The coin return mechanism is removed by inserting a bar into the opening in the coin return mechanism into which a finger is normally inserted to retrieve the unsuccessful caller's coins. The outer end of the bar is then pushed downwards to rock and crush the coin return mechanism about its line of engagement with the edge of the pay telephone casing at the bottom of the slot in which the coin return mechanism is situated, to where it can be pulled straight out.

Thereafter coins being returned to the caller for unsuccessful calls fall into the back of the coin box beyond the reach of the caller's fingers. Pay telephone users are thus deprived of their monies inserted for unsuccessful calls.

Periodically the vandal returns, and with the aide of a stick or the like having a glue material at its end, retrieves the returned coins in the back of the telephone casing.

Besides the ill will of unsuccessful callers who lost their coins, the phone company is subjected to the high cost of replacement parts and repair of the dammaged pay phones.

SUMMARY OF THE INVENTION

Accordingly, it is an object of the invention to insure that coins for unsuccessful pay telephone calls are available to the caller for retrieval.

Another object of the invention is to reduce the damage that may be done to coin operated pay phones by acts of vandalism.

A more specific object of the invention is to prevent the removal of coin return mechanisms by vandals.

A still more specific object of the invention is to prevent the removal of coin return mechanisms by inserting a bar into the finger opening thereof and pushing down on the outer end thereof.

Yet another object of the invention is to reduce the parts replacement and repair costs for vandalized pay phones.

A related object of the invention is to protect the telephone company from the ill will of unsuccessful telephone callers whose coins were unretrievable by fingers.

A still further object of the invention is to encourage the use of pay telephones in high crime areas.

Yet another object of the invention is to encourage the installation of pay telephones in poor or ghetto areas where individual or family phones are a rarity.

An additional object of the invention is to provide a simple and easy protection against such vandalism, and one that is inexpensive.

The objects of the invention are achieved by the use of reinforcing bar specially designed to fit in the available space in a standard telephone casing and react with appropriate structure to prevent rocking of the coin return mechanism by a bar inserted into the finger slot of the coin return mechanism and pushed downward at its outer end. The reinforcing bar is mounted behind the coin chute conveying coins from a coin release mechanism through an opening in a horizontal casing-strengthening plate to the coin return mechanism. It too extends down through the casing strengthening plate and beyond the coin chute, but is formed with a shoulder at the end of the chute. The shoulder engages the upper surface of the rear end of the coin return mechanism to prevent upward movement of the rear end of the coin return mechanism and hence rocking of that mechanism, to prevent its removal. The bar is held against upward movement by a slot cut in it which is received on a ledge forming the rear portion of the strengthening plate surrounding the opening through which the coin chute and the bar extend downwards, the chute being first temporarily removed to facilitate mounting of the reinforcing bar on the ledge.

Rocking of the bar counterclockwise (as seen in FIG. 1) about its mounting on the ledge is prevented by the rear wall of the telephone casing. Clockwise rocking of the bar is prevented by the rear wall of the coin chute which is suitably secured to the horizontal strengthening plate. Thus with the bar being secured in place against all movement, its shoulder resting on the upper rear surface of the coin return mechanism is effective to prevent rocking of the later by a bar inserted in it via the finger slot and pushed downwards at its outer end.

A groove in the middle of the forward side of the bar extends from the shoulder to its upper end and accommodates extensions from the rear side of the coin chute.

BRIEF DESCRIPTION OF THE DRAWINGS

These and other objects features and advantages of the invention will become apparent from a reading of the following specification when considered with the accompanying drawings wherein.

DETAILED DESCRIPTION OF THE PREFERRED EMBODIMENT OF THE INVENTION

Figure 2B:
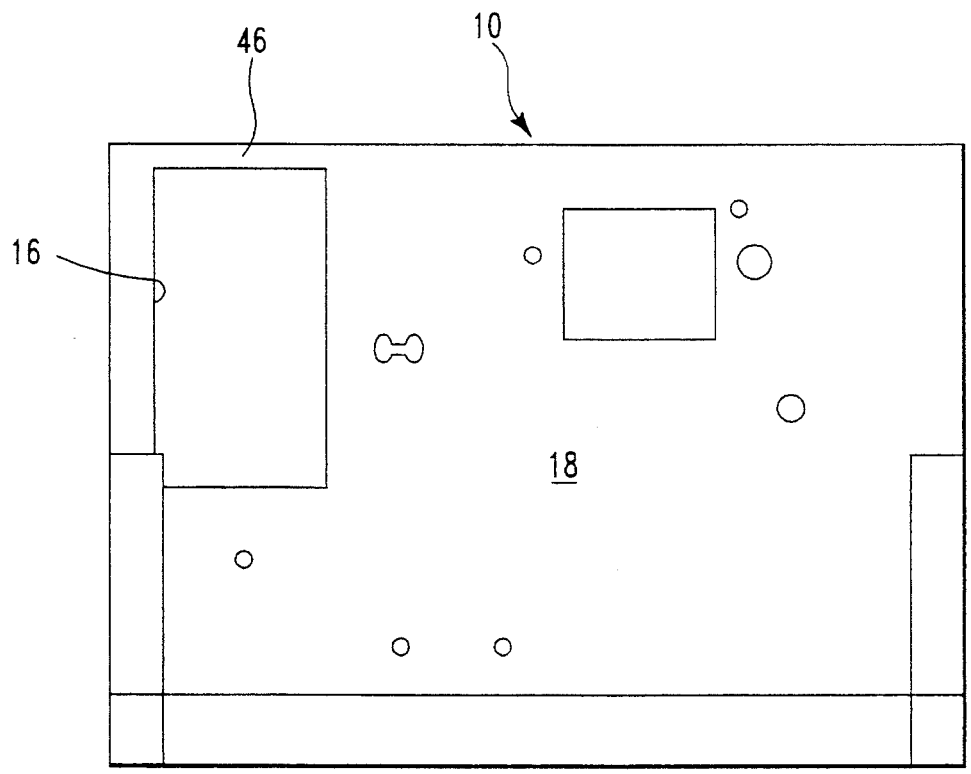
FIG. 2B is the same horizontal view but with the internals removed to show the opening in the horizontal strengthening plate through which the internals extend.
Figure 2A:
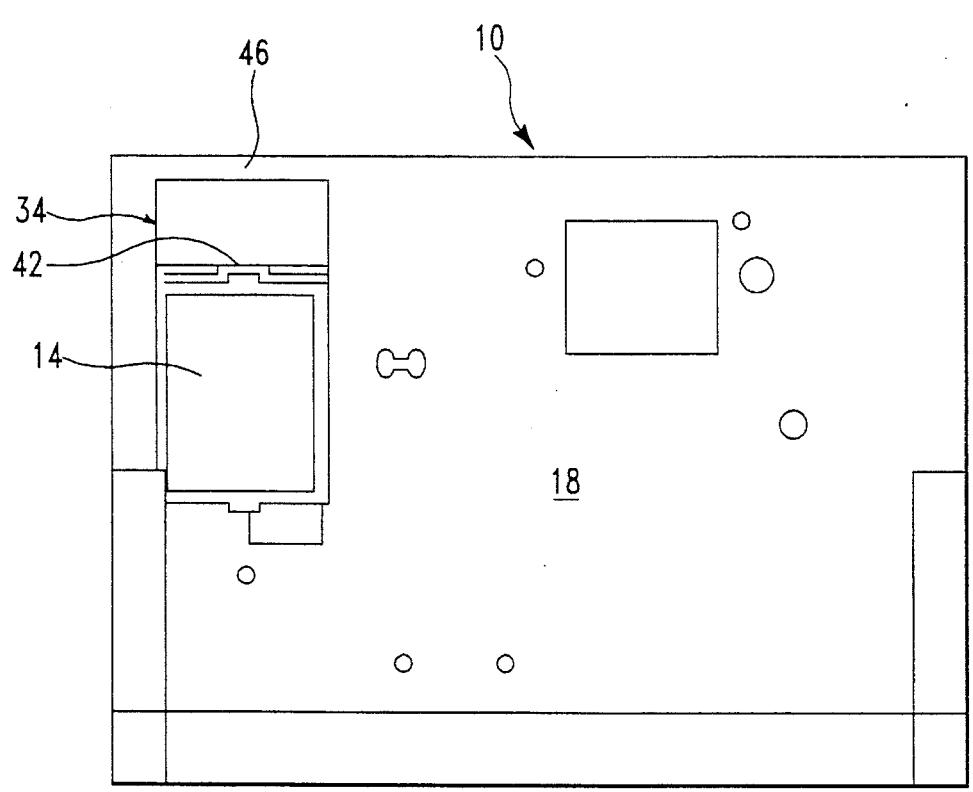
FIG. 2A is a horizontal view of the internals of the bottom of pay telephone from above the horizontal strengthening plate, as if taken along the section 2—2 of FIG. 1.

Referring now particularly to the drawings, a pay telephone is shown as including a casing generally indicated by the numeral 10 and generally rectangular in cross-section sidewise, frontwise, and horizontalwise. It also includes a coin release mechanism generally indicated by the numeral 12 which temporarily holds the coins inserted by the potential caller. If the call is completed, the coins are sent on to the coin collection box. However, if the call is not completed, the coins are deflected into the coin chute 14. The coin chute 14 extends downward through a large opening 16 (FIG 2B) in a horizontal strengthening plate 18 to which it is suitably secured, to where it matches up with a coin receiving opening 20 in a coin return mechanism generally indicated by the numeral 22.

The coin return mechanism 22 also includes a rectangular front opening 24 at the end of a tube 25 rectangular in crosssection and through which a caller retrieves his coins for an incompleted call, and a rear wall which slopes forwardly to deliver coins being returned to a well 28 near the front opening 24. The front end of the coin return mechanism 22 includes a flange 30 which extends laterally beyond the perimeter of the opening in the front wall of the casing 10. The lower front edge of the tube 25 of the coin return mechanism behind the flange 30 is the terminus for a floor 32 of the tube 25 extending upwardly from the well 28, and is the line of engagement with the edge of the telephone casing when an effort is made to rock the coin return mechanism by a bar inserted into the opening 24 and pushed down at its outer end.

Destructive bar rocking of the coin return mechanism 22 is prevented by the installation of the reinforcing bar generally indicated by the numeral 34. The bar is made of nylon or a similar tough material.

Figure 1:
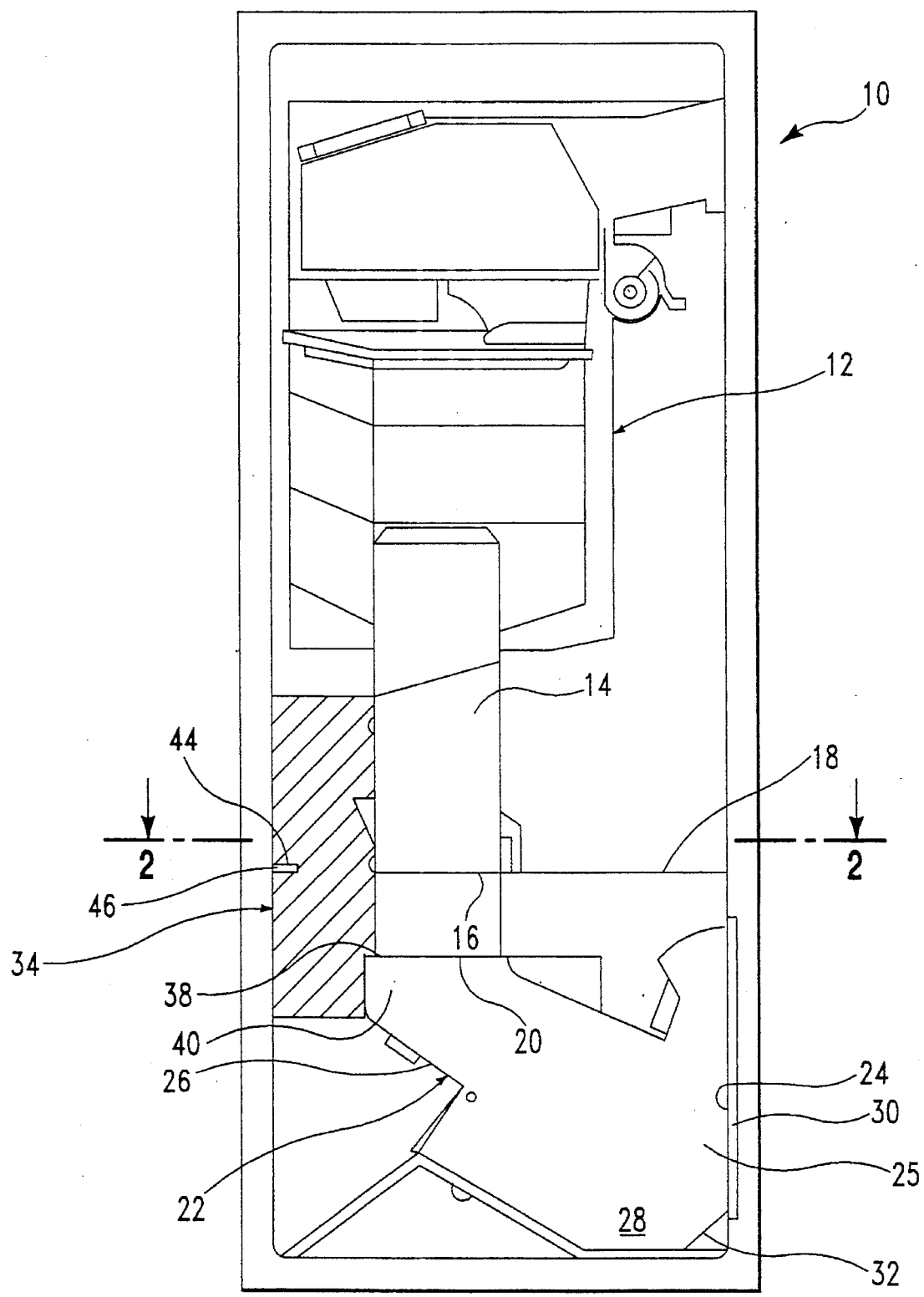
FIG. 1 is a left side view showing the internals of a pay telephone containing applicant's reinforcing bar.
Figure 3:
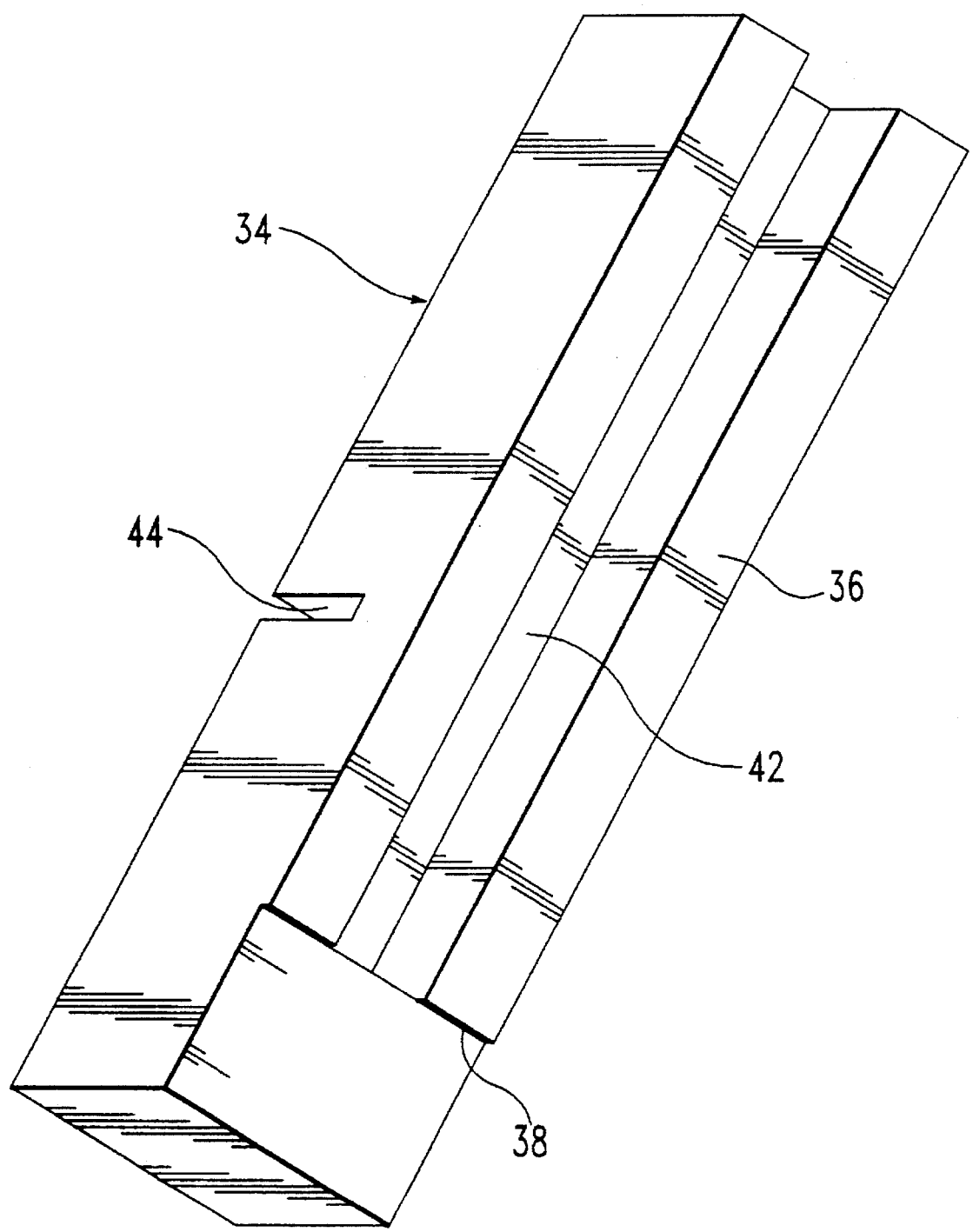
FIG. 3 is an enlarged view in perspective of the reinforcing bar.

As best seen in FIG. 3, the reinforcing bar 34 on its front (FIG. 1, upper in FIG. 3) surface 36, is cut-away at its lower end to define a shoulder 38 extending across it for engagement by the upper rear end 40 of the coin return mechanism 22. It is also cut-away with a longitudinally extending groove 42 for receiving laterally and rearwardly extending projections on back of the coin chute 14. On its lower side (FIG. 3) (back side FIG. 1), the bar is formed with a crosswise slot 44 which is received on the ledge 46 constituting the rear portion of the horizontal strengthening plate 18 surrounding the opening through which the coin chute and the bar 34 extend.

In installation on an existing coin pay telephone, after opening the casing to gain access to the inside of the phone, the coin chute 14 would first be removed. Then the reinforcing bar would be inserted down through the opening in the strengthening plate 18 to where its lower end passed behind the rear end of the coin return mechanism 22 and its shoulder 38 rested on top surface of the upper portion 40 of rear of the coin return mechanism. The reinforcing bar 34 would then be rocked rearwardly to where its slot 44 was received about the ledge 46 of the strengthening plate 18. The coin chute 14 could then be remounted, and the casing closed. The phone would now be protected against vandalism which involves inserting a bar into the finger opening of the coin return mechanism 22.

The particular kind of vandalism would be defeated because the coin return mechanism 22 is now prevented from rocking. Any effort to rotate the coin return mechanism 22 is now additionally rebuffed by the upper rear edge 40 of the mechanism 22 being restrained by the shoulder 38 on the bar 34. The bar is prevented from moving to retain the shoulder 38 in place restraining the coin return mechanism from rocking, vertically by the ledge 46 received in its slot 44, counterclockwise about the ledge 46 by the rear wall of the casing engaging the upper end of the bar, and clockwise about the ledge 46 by a lower portion of the rear wall of the casing engaging the lower end of the bar.

The cut-away portion of the bar 34 extends down behind the rear of the coin return mechanism 22 to prevent counterclockwise rocking of the mechanism about its line of engagement via the tube 25 with the edge of the casing 10 on the upper side of the opening 24. This prevents loosening of the mechanism in the casing with the aim of bypassing the reinforcing bar shoulder 38.

During manufacture of a coin pay telephone, the reinforcing bar 34 would be included in the assembly of the product, following normal assembly procedures.

A feature of the invention is that the reinforcing bar is totally within the pay telephone casing so that its effective operation cannot be defeated by would-be vandals without destroying the telephone and its coin collecting abilities.

What is claimed is:

1. In a coin operated pay telephone, a telephone casing having at intermediate of its height a horizontal strengthening plate that has a rear opening and having a rectangular front opening below said plate, a coin return mechanism having a tube rectangular in cross section extending forwardly out of said rectangular front opening where the mechanism terminates in a lateral flange about the casing and having an upper rear portion formed with a coin receiving opening below said rear opening, a coin chute communicating with said coin receiving opening in said coin return mechanism and extending through said rear opening, and a reinforcing bar also extending through said rear opening and having a shoulder engaging the upper side of the upper rear portion of the coin return mechanism to prevent its being rocked clockwise about the line of engagement of its tube behind its lateral flange with the casing below said rectangular front opening.

2. In a coin operated pay telephone, a telephone casing having at intermediate of its height a horizontal strengthening plate that has a rear opening and having a rectangular front opening below said plate, a coin return mechanism having a tube rectangular in cross section extending forwardly out of said rectangular front opening where the mechanism terminates in a lateral flange about the casing and having an upper rear portion formed with a coin receiving opening below said rear opening, a coin chute communicating with said coin receiving opening in said coin return mechanism and extending through said rear opening, and a reinforcing bar also extending through said rear opening and engaging the upper side of the upper rear portion of the coin return mechanism to prevent its being rocked clockwise about the line of engagement of its tube behind its lateral flange with the casing below said rectangular front opening, wherein the reinforcing bar engages the upper surface of the upper rear portion of the coin return mechanism via a shoulder formed in it to prevent the clockwise rocking thereof.

3. A coin-operated pay telephone according to claim 2, wherein the reinforcing bar is cut-away at its lower end to form the shoulder.

4. A coin-operated pay telephone according to claim 3, wherein the cut-away portion of the reinforcing bar extends down behind the coin return mechanism to prevent counterclockwise rocking thereof about the line of engagement of its tube behind its lateral flange with the casing above the casing front opening.

5. In a coin operated pay telephone, a telephone casing having at intermediate of its height a horizontal strengthening plate that has a rear opening and having a rectangular front opening below said plate, a coin return mechanism having a tube rectangular in cross section extending forwardly out of said rectangular front opening where the mechanism terminates in a lateral flange about the casing and having an upper rear portion formed with a coin receiving opening below said rear opening, a coin chute communicating with said coin receiving opening in said coin return mechanism and extending through said rear opening, and a reinforcing bar also extending through said rear opening and engaging the upper side of the upper rear portion of the coin return mechanism to prevent its being rocked clockwise about the line of engagement of its tube behind its lateral flange with the casing below said rectangular front opening, wherein the reinforcing bar has a horizontal slot in its back surface that is received on the ledge constituting the portion of the strengthening plate behind its rear opening.

6. In a coin operated pay telephone, a telephone casing having at intermediate of its height a horizontal strengthening plate that has a rear opening and having a rectangular front opening below said plate, a coin return mechanism having a tube rectangular in cross section extending forwardly out of said rectangular front opening where the mechanism terminates in a lateral flange about the casing and having an upper rear portion formed with a coin receiving opening below said rear opening, a coin chute communicating with said coin receiving opening in said coin return mechanism and extending through said rear opening, and a reinforcing bar also extending through said rear opening and engaging the upper side of the upper rear portion of the coin return mechanism to prevent its being rocked clockwise about the line of engagement of its tube behind its lateral flange with the casing below said rectangular front opening, wherein the coin chute has a lateral protrusion on it rear surface, and the reinforcing bar is formed with a longitudinally extending groove on its front surface to receive the lateral protrusion.

7. In a coin operated pay telephone, a telephone casing having at intermediate of its height a horizontal strengthening plate that has a rear opening and having a rectangular front opening below said plate, a coin return mechanism having a tube rectangular in cross section extending forwardly out of said rectangular front opening where the mechanism terminates in a lateral flange about the casing and having an upper rear portion formed with a coin receiving opening below said rear opening, a coin chute communicating with said coin receiving opening in said coin return mechanism and extending through said rear opening, and a reinforcing bar also extending through said rear opening and engaging the upper side of the upper rear portion of the coin return mechanism to prevent its being rocked clockwise about the line of engagement of its tube behind its lateral flange with the casing below said rectangular front opening, wherein the reinforcing bar is made of nylon.

8. For use in a coin-operated pay telephone including a telephone casing having at intermediate of its height a horizontal strengthening plate that has a rear opening and having a rectangular front opening below said plate, a coin return mechanism having a tube rectangular in cross section extending forwardly out of said rectangular front opening where the mechanism terminates in a lateral flange about the casing and having an upper rear portion formed with a coin receiving opening below said rear opening, and a coin chute communicating with said coin receiving opening in said coin return mechanism and extending through said rear opening; a reinforcing bar for extending through said rear opening and having a shoulder engaging the upper surface of the upper rear portion of the coin return mechanism to prevent its being rocked clockwise about the line of engagement of its tube behind its lateral flange with the casing below said rectangular front opening.

9. For use in a coin-operated pay telephone including a telephone casing having at intermediate of its height a horizontal strengthening plate that has a rear opening and having a rectangular front opening below said plate, a coin return mechanism having a tube rectangular in cross section extending forwardly out of said rectangular front opening where the mechanism terminates in a lateral coin receiving opening below said rear opening, and a coin chute communicating with said coin receiving opening in said coin return mechanism and extending through said rear opening; a reinforcing bar for extending through said rear opening and engaging the upper surface of the upper rear portion of the coin return mechanism to prevent its being rocked clockwise about the line of engagement of its tube behind its lateral flange with the casing below said rectangular front opening, wherein the reinforcing bar is for engaging the upper side of the upper rear portion of the coin return mechanism via a shoulder formed in it to prevent the clockwise rocking thereof.

10. A reinforcing bar according to claim 9, wherein the reinforcing bar is cut-away at its lower end to form the shoulder.

11. A reinforcing bar according to claim 10, wherein the cut-away portion of the reinforcing bar is for extending down behind the coin return mechanism to prevent counterclockwise rocking thereof about the line of engagement of its tube behind its lateral flange with the casing above the casing front opening.

12. For use in a coin-operated pay telephone including a telephone casing having at intermediate of its height a horizontal strengthening plate that has a rear opening and having a rectangular front opening below said plate, a coin return mechanism having a tube rectangular in cross section extending forwardly out of said rectangular front opening where the mechanism terminates in a lateral flange about the casing and having an upper rear portion formed with a coin receiving opening below said rear opening, and a coin chute communicating with said coin receiving opening in said coin return mechanism and extending through said rear opening; a reinforcing bar for extending through said rear opening and engaging the upper surface of the upper rear portion of the coin return mechanism to prevent its being rocked clockwise about the line of engagement of its tube behind its lateral flange with the casing below said rectangular front opening, wherein the reinforcing bar has a horizontal slot in its back surface for being received on the ledge constituting the portion of the strengthening plate behind its rear opening.

13. For use in a coin-operated pay telephone including a telephone casing having at intermediate of its height a horizontal strengthening plate that has a rear opening and having a rectangular front opening below said plate, a coin return mechanism having a tube rectangular in cross section extending forwardly out of said rectangular front opening where the mechanism terminates in a lateral coin receiving opening below said rear opening, and a coin chute communicating with said coin receiving opening in said coin return mechanism and extending through said rear opening; a reinforcing bar for extending through said rear opening and engaging the upper surface of the upper rear portion of the coin return mechanism to prevent its being rocked clockwise about the line of engagement of its tube behind its lateral flange with the casing below said rectangular front opening, wherein the coin chute has a lateral protrusion on its rear surface, wherein the reinforcing bar is formed with a longitudinally extending groove on its front surface to receive the lateral protrusions.

14. For use in a coin-operated pay telephone including a telephone casing having at intermediate of its height a horizontal strengthening plate that has a rear opening and having a rectangular front opening below said plate, a coin return mechanism having a tube rectangular in cross section extending forwardly out of said rectangular front opening where the mechanism terminates in a lateral flange about the casing and having an upper rear portion formed with a coin receiving opening below said rear opening, and a coin chute communicating with said coin receiving opening in said coin return mechanism and extending through said rear opening; a reinforcing bar for extending through said rear opening and engaging the upper surface of the upper rear portion of the coin return mechanism to prevent its being rocked clockwise about the line of engagement of its tube behind its lateral flange with the casing below said rectangular front opening, wherein the reinforcing bar is made of nylon.

* * * * *